May 6, 1941.  J. P. FOULDS  2,241,059
LIGHT PROJECTOR
Filed Oct. 19, 1939  2 Sheets-Sheet 1
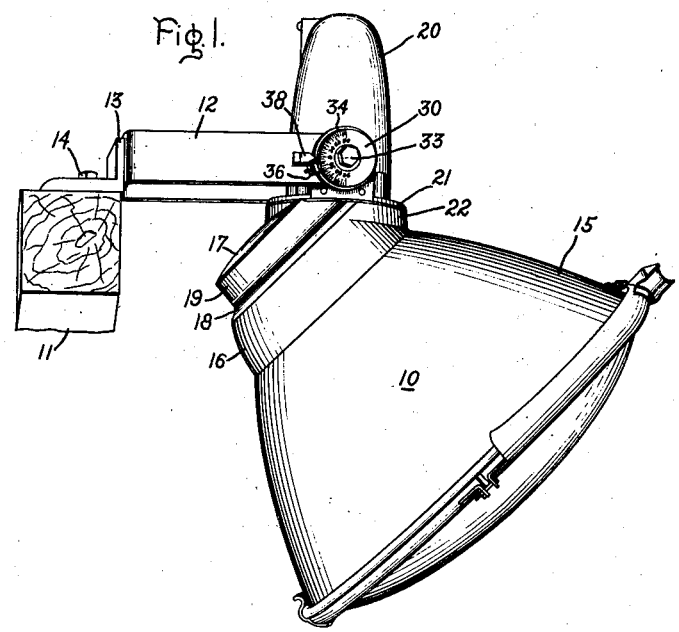
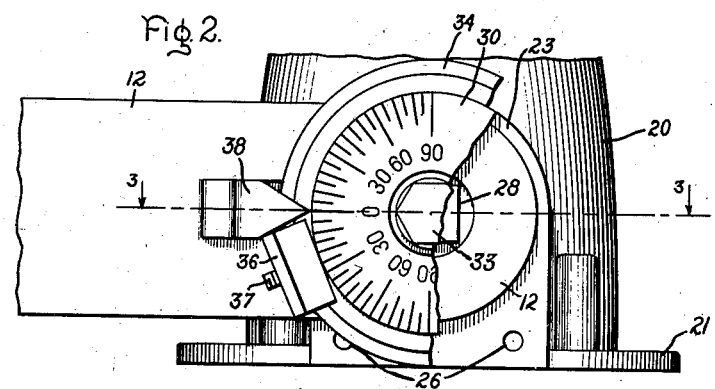
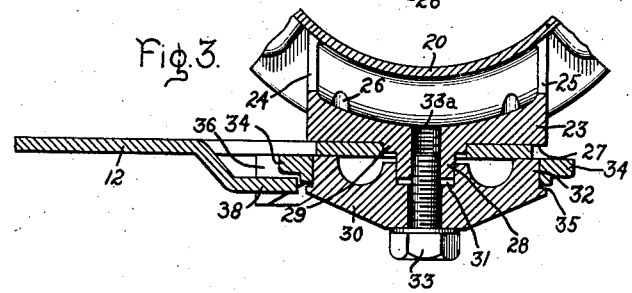
Inventor:
John P. Foulds,
by Harry E. Dunham
His Attorney.

May 6, 1941.    J. P. FOULDS    2,241,059
LIGHT PROJECTOR
Filed Oct. 19, 1939    2 Sheets-Sheet 2

Inventor:
John P. Foulds,
by Harry E. Dunham
His Attorney.

Patented May 6, 1941

2,241,059

UNITED STATES PATENT OFFICE 2,241,059

LIGHT PROJECTOR

John P. Foulds, Revere, Mass., assignor to General Electric Company, a corporation of New York Application October 19, 1939, Serial No. 300,177

6 Claims. (Cl. 248—291)

This invention relates to light projectors of the type that are adjustable about one or more axes, and more particularly to improved locking means for accurately locking such projectors in predetermined positions about these respective axes.

One object of my invention is to provide locking means which will accurately lock the projector in its predetermined position without deviating the projector from this position during the locking process.

Another object of my invention is to provide a projector support and locking device which will not loosen in response to prolonged vibrations, of the projector, set up by winds.

Another object of my invention is to provide improved relocating means whereby the projector may be released from its locked position, for cleaning purposes, and may be accurately positioned and locked in its original position without readjustment.

For a better understanding of my invention, together with other and further objects thereof, reference is had to the following description taken in connection with the accompanying drawings, and its scope will be pointed out in the appended claims.

Figure 4:
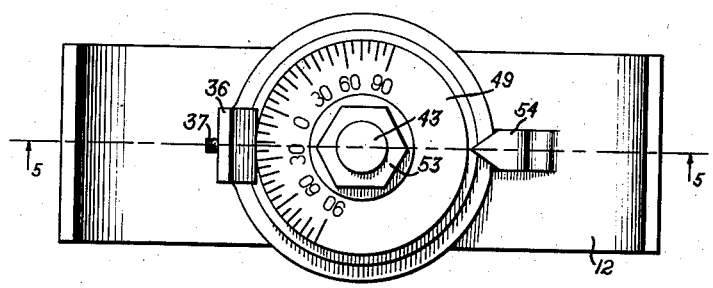
Figure 5:
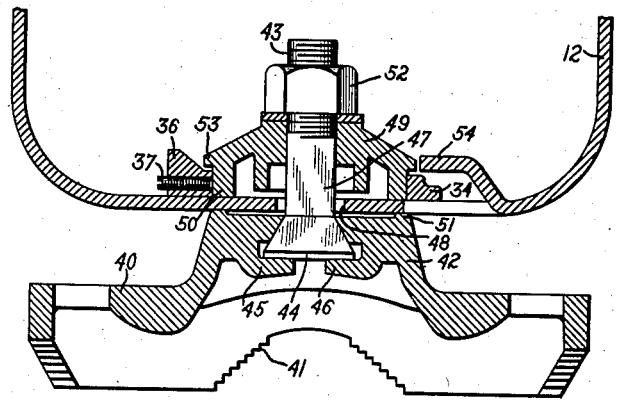

In the accompanying drawings, Fig. 1 illustrates a light projector provided with locking means built in accordance with my invention and arranged to lock a projector into positions relatively to a supporting bracket about a predetermined axis; Fig. 2 is an enlarged view of the locking means of Fig. 1; Fig. 3 is a sectional view taken along line 3—3 of Fig. 2; Fig. 4 is a modification of my invention applied to adjusting means arranged for adjusting the projector supporting bracket about a predetermined axis; and Fig. 5 is a sectional view along line 5—5 of Fig. 4.

Referring to the drawings in detail, Fig. 1 illustrates a conventional floodlight projector 10 supported on a conventional cross-arm 11 by a U-shaped bracket 12, the closed end of the bracket being welded, in this instance, to one side of an angle iron 13, the other side of which is bolted to the cross-arm 11 by a bolt 14.

The floodlight projector comprises a conoidal housing, the inner surface of which is finished to reflect light from an enclosed source. The section 15 of this housing is preferably a paraboloid, the second and adjacent section 16 is preferably spheroidal, and the end section 17 is also spheroidal, being joined to section 16 by a reducing flange 18 and a cylindrical section 19. The light source (not shown) is preferably an incandescent lamp, the socket for which is enclosed in an auxiliary housing 20 which is an elongated cylindrical housing slightly tapered and closed at its upper end. It is provided at its lower end with a suitable flange 21 which is attached to a suitable seat 22 projecting from the reflector housing at an angle to the reflector axis. The angular relation of the cylindrical auxiliary housing 20 to the conoidal housing is such that the axis of the auxiliary housing will be as nearly vertical as possible during the predominantly used positions of the projector, it being advantageous to operate the incandescent lamp in a vertical position.

The mechanism for adjusting the projector relatively to its supporting bracket and the manner of locking it in its adjusted position is more clearly illustrated in Figs. 2 and 3. In Fig. 2, one side of a fragment of the auxiliary housing 20 is illustrated in an enlarged front elevation. A supporting plate 23 is attached to the side of the housing by being cast integral with the housing 20, but may be attached in any suitable manner. The preferred manner of attaching this plate 23 is to die-cast it integral with the housing. It is joined at its lower end to the edge of the flange 21 and is attached, above the flange, to the housing body by ribs 24 and 25 (see Fig. 3). The pocket formed by these ribs, between plate and housing, is drained of rain water by holes 26. The supporting surface 27 of the plate is parallel to the axis of the auxiliary housing and parallel to the bracket arm 12, the end of which is contiguous to this surface. Another similar plate (not shown) is attached to the other side of the housing 20, the spacing between the plates on opposite sides of the auxiliary housing being equal to the spacing between the two arms of the U-shaped bracket 12.

Projecting from the surface 27 of plate 23 is a pivot pin 28. The outer section of the pivot pin is given an irregular cross section relatively to its axis. In the illustrated example, the major portion of the pin is square, having only a short round section 29. The round section 29 projects through a corresponding hole in the bracket arm 12 and provides the bearing surface upon which the pivot pin and entire projector may be turned about the axis of this pin relatively to the bracket arm. In order to lock the projector in any position to which it may be moved in its bearing and in relation to its supporting bracket, a locking disc 30 is provided. This disc is provided with an irregular recess 31 conforming to the shape of the irregular section of the pivot pin 28. It is also provided with a cylindrical flange 32 at its periphery. When the projector is assembled with its supporting bracket, the pin 28 projects through the hole in the bracket arm and the round section 29 centers the pin in this hole. The disc 30 is placed over the end of the pin until the flange 32 contacts the surface of the bracket arm. At that position, the end of the pin 28 projects into the recess 31. The recess is made deep enough to permit some movement of the disc axially of the pin, but the irregular (square) section of the pin and recess prevents relative rotational movement between the pin and disc. A bolt 33 is then projected through a center hole in the disc 30 and turned into a suitable tapped hole 33a in the plate 23. The head of the bolt forces the disc 30 against the bracket arm and thereby clamps this arm against the supporting surface 27. By this means, the projector may be locked in any position within its range of movement, about its axis, in the bracket.

During the tightening of the bolt 33, a torque is exerted upon the projector housing by the bolt threads and upon the disc 30 by the head of the bolt because of the friction therebetween. This torque would normally slightly rotate the disc and the projector relatively to the bracket, if it were greater than the friction between the projector, disc and the bracket. The disc is, however, locked to the projector through the pivot pin to prevent any movement between the disc and the projector. The disc 30 merely moves axially of the pin and clamps the bracket arm between itself and the plate. The friction of the bolt is thereby opposed by the combined friction of the plate surface 27 and the disc flange 32 against the bracket arm. This combined friction is greater than that of the bolt against the projector and disc and therefore no movement occurs between the bracket and the projector.

The projector is also exposed to prolonged vibration due to the friction of high velocity winds, the projectors being mounted on high towers out of doors. This vibration has heretofore caused a loosening of the projector locking means, this loosening being due to the slight movement of the projector housing and pivot pin relatively to the bracket, which effects a movement of the bolt, the head of which has heretofore been contiguous to the stationary bracket. In the present structure, the head of the bolt is contiguous to the disc 30 and this disc is rigidly connected by the irregularly shaped pin to the projector housing. Therefore, no movement of the disc, nor of the bolt, relatively to the projector takes place. For the purpose of convenience, the disc 30 is provided with indicia to aid in the positioning of the projector.

For the purpose of conveniently servicing projectors of the type described, it is often necessary to turn the projector about its axis. A battery of such projectors, for example, is serviced from a single platform and each projector must be turned to enable an operator to clean or relamp such projector. In view of the great accuracy required in the positioning of each projector, some simple means of returning the projector to its proper position is desirable. In the illustrated embodiment of my invention, this relocating function is obtained by the provision of a ring 34 surrounding the flange 32 on the disc 30. The ring 34 is held in place on the flange surface between the bracket 12 and a flange 35 projecting over the upper end of the flange 32 at its intersection with the disc 30. The ring 34 is provided with a lug 36 through which a set screw 37 projects to engage the surface of the flange 32. This set screw may be turned to release the ring and thereby enable the ring to be turned on the flange 32. The ring is turned until one side of the lug 36 engages a pointer 38 on the bracket 12. This pointer is preferably a portion of the bracket stamped out and raised above the bracket surface to a height sufficient to prevent the passing of the lug 36. During the positioning of the projector the set screw 37 is turned to permit a free rotation of the ring 34 on the flange 32. When the projector is finally positioned, the lug 36 is brought into engagement with one side of the pointer 38 and the set screw 37 is turned until it engages the flange 32 and thereby locks the ring 34 against rotation on this flange. The projector may thereafter be released and moved to any desired position for servicing purposes and then may be accurately repositioned by merely turning the projector until the lug 36 again engages the side of the pointer 38.

In Figs. 4 and 5, a modification of my invention is illustrated. In this modification, a base in the form of a clamp 45 is illustrated for mounting the bracket 12 in any desired position and capable of adjustment relatively to this base. It is provided with toothed notches 41 by means of which the clamp may grip the surface of a round support, such as a pipe for example, when bolted thereto. The base is provided with a centrally located supporting column 42 in which a square bolt 43 is mounted to project above the end surface of the column. The bolt is provided with a pyramidal head 44 which fits into a corresponding opening in the column 42. The bolt head is then held in place by prongs 45, 46 which are integral with the column 42 and are bent into horizontal position under the head 44 after the head 44 is in place. The body 47 of the bolt 43 projects through a hole 48 in the bracket 12 and a disc 49, which is a modification of the disc 30 only to the extent that the irregular recess projects all the way through the disc, is placed upon the bolt adjacent the other side of the bracket. In this modification the bolt is the pivot about which the bracket 12 turns. The disc 49 is provided with a flange 50 arranged to engage the surface of the bracket 12 above a rim flange 51 on the column 42, the rim flange 51 being the supporting surface for the bracket. The disc 49 is provided with an irregularly shaped hole to correspond with the cross section of the bolt 47, so that when a nut 52 is placed upon the threaded end of the bolt and is turned to clamp the bracket between the disc and the column, no rotational movement of the disc 49 will take place during this locking and releasing process.

The disc 49 is also provided with a relocating ring 34 surrounding, and adjacent to, the flange 50 of the disc. This ring is held in engagement with the outer surface of flange 49 in a channel formed between a slightly projecting flange 53 at the upper end of the cylindrical flange 50 and the surface of the bracket 12. The ring 34 may be moved about the disc 49 so as to place the lug 36 in any desired position about the disc and the ring may then be locked to the disc 49 by tightening the set screw 37. A pointer 54 is provided on the bracket 12 and projects above the surface of the bracket in a common plane with the lug 36. In operation, the bracket 12 is moved to any desired position about the axis of the bolt 43 on the bracket column 42, and is then locked into position. The ring 34 is loosened by turning the set screw 37. It may then be turned until the end surface of the lug 36 engages the side of the pointer 54. The set screw is then turned to engage the flange surface, and thereby lock the ring in this position. If then the bracket is released for turning the projector, for cleaning or other servicing purposes, it may again be relocated by merely moving the bracket until the side of the pointer 54 engages the side of the lug 36, no further readjustment being necessary.

What I claim as new and desire to secure by Letters Patent of the United States, is:

1. In a positioning device for a light projector, the combination of a bracket, a supporting surface contiguous to one side of said bracket, a pivot pin projecting through said bracket from said surface, a disc provided with a recess and mounted upon said pin contiguous to said bracket on a side opposite to said supporting surface, means for maintaining a constant angular relationship between said pin and said disc, and means for moving said disc axially of said pivot pin to clamp said bracket between said disc and said supporting surface.

2. In a positioning device for a light projector, the combination of a base, a pivot pin attached thereto having an irregular cross section, a bracket mounted on said base for rotation about the axis of said pivot pin, a locking disc provided with a recess for receiving said irregularly shaped pivot pin, said recess maintaining a constant angular relationship between said pivot pin and said disc about a common axis, and means for axially moving said locking disc to clamp said bracket between said locking disc and said base.

3. In a positioning device for a light projector, the combination of a light projector casing, a pivot pin attached thereto, a bracket for supporting said casing and provided with means to receive said pivot pin, a locking disc provided with a recess for receiving said pin, means for maintaining a constant angular relationship between said pivot pin and said locking disc about a common axis, and means for moving said disc axially of said pivot pin against said bracket to clamp said bracket between the projector housing and said disc and thereby lock said projector housing in its angular position relative to the bracket.

4. In a positioning device for a light projector, the combination of a light projector housing, a bracket for supporting said housing, a pivot pin projecting through a hole in said bracket and provided with a circular section and an irregular cross section said circular section projecting into said hole and said irregular section projecting beyond said hole in said bracket, a locking disc provided with a recess for receiving said irregular section and having an irregular cross section corresponding to the irregular cross section of said pivot pin to maintain a constant angular relationship between said pivot pin and said disc about their common axis and means for moving said disc axially of said pivot pin against said bracket to clamp said bracket between the projector housing and said disc and thereby lock said projector housing in its angular position relatively to the bracket.

5. In a positioning device for a light projector, the combination of a bracket, a support therefor, a pivot pin projecting through a suitable opening in said bracket and provided with an irregular cross section, a disc provided with a recess corresponding in cross section to said irregular pivot pin arranged to receive said pin whereby a constant angular relationship is maintained between said pin and disc, means operable to move said disc axially of said pin to clamp and release said bracket, a collar mounted on the periphery of said disc and provided with a stop lug, a position indicating pointer on said bracket arranged to cooperate with said lug to position said bracket about the periphery of said disc and means for locking said ring in any desired position about said disc whereby the bracket may be repeatedly released and repositioned in the position determined by said lug.

6. In a positioning device for a light projector, the combination of a bracket, a supporting surface contiguous to one side of said bracket, a pivot pin projecting through said bracket from said surface, a disc mounted upon said pin contiguous to said bracket on a side opposite to said supporting surface, means for maintaining a constant angular relationship between said pin and said disc, means for moving said disc angularly of said pivot pin to clamp said bracket between said disc and said supporting surface, and positioning means upon said disc adjustable about the periphery of said disc for determining the position of said bracket about said disc.

JOHN P. FOULDS.